(12) United States Patent
Ueno et al.

(10) Patent No.: US 6,820,413 B2
(45) Date of Patent: Nov. 23, 2004

(54) STATE DETERMINING APPARATUS FOR EXHAUST GAS PURIFIER

(75) Inventors: Masaki Ueno, Saitama-ken (JP); Yoshihisa Iwaki, Saitama-ken (JP); Shiro Takakura, Saitama-ken (JP); Yasuyuki Miyahara, Saitama-ken (JP); Tadashi Sato, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/235,815

(22) Filed: Sep. 6, 2002

(65) Prior Publication Data

US 2003/0046925 A1 Mar. 13, 2003

(30) Foreign Application Priority Data

Sep. 7, 2001 (JP) ........................................ 2001-272753

(51) Int. Cl.$^7$ ................................................ F01N 3/00
(52) U.S. Cl. .............................. 60/277; 60/276; 60/284; 60/297
(58) Field of Search .......................... 60/274, 276, 277, 60/284, 297, 288, 311; 73/23.31, 23.32, 118.1, 25.04, 29.01

(56) References Cited

U.S. PATENT DOCUMENTS

| | | | | |
|---|---|---|---|---|
| 5,713,197 A | * | 2/1998 | Ogawa et al. | ................. 60/277 |
| 5,837,884 A | * | 11/1998 | Kimura et al. | ............. 73/25.04 |
| 6,141,960 A | * | 11/2000 | Takami et al. | ................. 60/297 |
| 6,158,212 A | * | 12/2000 | Tanaka | ........................ 60/277 |
| 2001/0025484 A1 | * | 10/2001 | Ueno et al. | ................... 60/277 |

FOREIGN PATENT DOCUMENTS

JP      5-256124      * 10/1993

* cited by examiner

Primary Examiner—Tu M. Nguyen
(74) Attorney, Agent, or Firm—Westerman, Hattori, Daniels & Adrian, LLP

(57) ABSTRACT

A state determining apparatus for an exhaust gas purifier is provided for accurately determining the state of the exhaust gas purifier including an adsorbent for adsorbing hydrocarbons, including a deterioration of the adsorbent, in accordance with an ignition time of an internal combustion engine. The state determining apparatus for an exhaust gas purifier is arranged in an exhaust system of the internal combustion engine for determining the state of the exhaust gas purifier including the adsorbent capable of adsorbing hydrocarbons and moisture in exhaust gas. The state determining apparatus has a humidity sensor arranged at a location downstream of the adsorbent in the exhaust system for detecting the humidity of exhaust gases, and an ECU for determining the state of the adsorbent in accordance with the humidity of exhaust gases detected by the humidity sensor, and the ignition time of the internal combustion engine.

8 Claims, 9 Drawing Sheets

STATE DETERMINING APPARATUS FOR EXHAUST GAS PURIFIER

BACKGROUND OF THE INVENTION

1. Field of the Invention

The present invention relates generally to a state determining apparatus for an exhaust gas purifier which purifies exhaust gases exhausted from an internal combustion engine, and more particularly, to a state determining apparatus for an exhaust gas purifier which purifies exhaust gases by adsorbing hydrocarbons contained in the exhaust gases by an adsorbent.

2. Description of the Prior Art

One type of internal combustion engine is provided with an adsorbent disposed in its exhaust system for adsorbing hydrocarbons in exhaust gases upon starting the engine. The adsorbent has, for example, zeolite on its surface, such that hydrocarbons within exhaust gases enter into pores of the zeolite and adsorbed by the adsorbent when the hydrocarbons pass through the adsorbent. As the adsorbent is heated to a predetermined temperature or higher (for example, 100–250° C.) by exhaust gases, the adsorbent desorbs once adsorbed hydrocarbons which are recirculated to the internal combustion engine through an EGR pipe and the like. While the adsorption and desorption of hydrocarbons are repeated in the adsorbent in the foregoing manner, a long-term use of the adsorbent may lead to a gradually increasing amount of residual hydrocarbons which could not be desorbed, and broken pores of the adsorbent. As a result, the adsorbent is deteriorated, causing gradually degraded capabilities of adsorbing hydrocarbons in the adsorbent. When the internal combustion engine is started in such a state, hydrocarbons not adsorbed by the adsorbent are emitted to the outside. Thus, a need exists for determining the state of the adsorbent, in particular, a deterioration thereof.

The applicant has proposed a deterioration determining apparatus for determining a deterioration of such an adsorbent, for example, in Japanese Patent Application No. 2000-338375. This deterioration determining apparatus takes advantage of a proportional relationship found between the capabilities of the adsorbent to adsorb hydrocarbons and moisture, and detects the humidity of exhaust gases which have passed through the adsorbent by a humidity sensor to determine degraded capabilities of the adsorbent to adsorb hydrocarbons and moisture, i.e., the deterioration of the adsorbent. More specifically, the deterioration determining apparatus sets a predetermined time required for a detected humidity of the humidity sensor to rise by a predetermined value associated with a gradual rise in humidity of exhaust gases which pass through the adsorbent, while moisture in the exhaust gases is adsorbed by the adsorbent, after the start of the engine, in accordance with the humidity at the start and the like, with reference to a normal adsorbent which has not been deteriorated, and measures a time actually taken by the detected humidity to rise by the predetermined value. Then, when the measured time is shorter than the predetermined time, the adsorbent is determined to be deteriorated from the fact that the rising speed of the detected humidity is higher or the detected humidity begins to rise at an earlier timing than when a normal adsorbent is used.

In addition, when the internal combustion engine is cold started, a rapid warm-up control may be conducted after the start mainly for purposes of activating a three-way catalyst at an earlier stage. Generally, the rapid warm-up control involves determining a retard amount for an ignition timing in accordance with the temperature of the internal combustion engine at the start, and controlling the ignition timing in a retarding direction to increase the temperature of exhaust gases.

However, the deterioration determining apparatus described above could fail to ensure a sufficient determination accuracy for the deterioration of the adsorbent, because the humidity sensor presents detected humidities at different rising speeds when the rapid warm-up control is conducted and when it is not conducted.

More specifically, for example, when an internal combustion engine is cold started, heat generated by exhaust gases is taken away by an exhaust system which has substantially the same temperature as the temperature in a starting environment (outside air temperature), so that the temperature of the exhaust gases is lower at a location more downstream of the exhaust system. Then, as the temperature decreases to the dew point (for example, 50–60° C.), moisture in exhaust gases begins condensing and attaches on the inner surface of an exhaust pipe and the like, so that the moisture in exhaust gases decreases more at a location more downstream in the exhaust system. Such condensation occurs more, at an earlier time, and at a more upstream location in the exhaust system as the exhaust system is at a lower temperature upon starting. For this reason, the detected humidity tends to present a lower rising speed because the adsorbent is supplied with exhaust gas with less moisture, i.e., with a lower humidity when the condensation occurs at a location upstream of the adsorbent.

When the rapid warm-up control is conducted during such a cold start, exhaust gases are at higher temperatures than when it is not conducted, so that the moisture in exhaust gases begins condensing later at a more downstream location in the exhaust system. Therefore, when the condensation occurs near the adsorbent or at a location downstream of the adsorbent, the adsorbent is supplied with exhaust gases, the humidity of which is not reduced, unlike when the rapid warm-up control is not conducted, so that the detected humidity tends to present a higher rising speed, and this tendency is intensified as the ignition timing is further retarded.

While the detected humidity presents a rising speed which varies depending on whether or not the rapid warm-up control is conducted, and depending on the retard amount for the ignition timing when the rapid warm-up control is conducted, the aforementioned deterioration determining apparatus merely sets a time elapsed from the start as a parameter for determining a deterioration of the adsorbent, so that it only provides an insufficient accuracy for determining the deterioration, and therefore leaves a room for improvement in this respect.

OBJECT AND SUMMARY OF THE INVENTION

The present invention has been made to solve the problems as mentioned above, and it is an object of the invention is to provide a state determination apparatus for an exhaust gas purifier which is capable of accurately determining the state of the exhaust gas purifier, which includes an adsorbent for adsorbing hydrocarbons, including a deterioration of the adsorbent, in accordance with an ignition timing of an internal combustion engine.

To achieve the above object, the present invention provides a state determining apparatus for an exhaust gas purifier arranged in an exhaust system of an internal combustion engine for determining a state of the exhaust gas purifier including an adsorbent capable of adsorbing hydrocarbons and moisture in exhaust gases. The state determining apparatus is characterized by comprising a humidity sensor arranged at a location downstream of the adsorbent in the exhaust system for detecting a humidity of exhaust gases; and adsorbent state determining means for determining a state of the adsorbent in accordance with the humidity of exhaust gases detected by the humidity sensor and an ignition time of the internal combustion engine.

According to the foregoing configuration, the humidity sensor detects the humidity of exhaust gases at a location downstream of the adsorbent of the exhaust gas purifier, and the adsorbent state determining means determines the state of the adsorbent in accordance with the result of detection, and an ignition time of the internal combustion engine. Since the abilities of the adsorbent to adsorb hydrocarbons and moisture is in a proportional relationship, the humidity detected by he humidity sensor has a high correlation to actually adsorbed hydrocarbons in the adsorbent. Also, as mentioned above, since exhaust gases vary in temperature depending on whether or not the rapid warm-up control is conducted depending on the ignition time, and on a retard amount of the ignition time when it is conducted, the humidity detected by the humidity sensor rises at a varying rate. Therefore, when the ignition time is used as a parameter in addition to the humidity of exhaust gases passing through the adsorbent for making the state determination, the state of the adsorbent can be accurately determined, including adsorption and desorption of hydrocarbons in the adsorbent, deterioration of the adsorbent, and the like, while the actual temperature of exhaust gases is reflected to the state determination.

Preferably, the foregoing state determining apparatus for an exhaust gas purifier further comprises calory calculating means for calculating calory supplied from the internal combustion engine to the exhaust system after the internal combustion engine is started, wherein the adsorbent state determining means further determines the state of the adsorbent in accordance with the calory calculated by the calory calculating means.

According to this preferred embodiment of the state determining apparatus, the calory calculating means calculates the calory supplied by the internal combustion engine to the exhaust gas after the start for determining the state of the adsorbent additionally in accordance with the calculated calory. It is therefore possible to further accurately determine the state of the adsorbent, while a varying (rising) temperature in the exhaust system and adsorbent after the start of the internal combustion engine is additionally reflected to the state determination.

Preferably, in the foregoing state determining apparatus for an exhaust gas purifier, the calory calculating means calculates the calory in accordance with the amount of fuel supplied to the internal combustion engine after the start and the ignition time.

According to this preferred embodiment of the state determining apparatus, the calory supplied to the exhaust system can be appropriately calculated in accordance with the amount of fuel supplied to the internal combustion engine after it is started, and the ignition time. Since the amount of fuel and the ignition time are known as parameters for controlling a combustion engine, the calory supplied to the exhaust system can be readily calculated using these control parameters without the need for additional sensors.

Preferably, the foregoing state determining apparatus for an exhaust gas purifier further comprises temperature state detecting means for determining a temperature state in the exhaust system; and threshold determining means for determining a threshold based on the temperature state in the exhaust system detected at the time the internal combustion engine is started, wherein the adsorbent state determining means determines the state of the adsorbent based on a result of comparison between the calory and the threshold when a change in the value detected by the humidity sensor after the internal combustion engine is started exceeds a predetermined value set therefor.

According to this preferred embodiment of the state determining apparatus, the state of the adsorbent can be determined when a change in the value detected by the humidity sensor after the internal combustion engine is started exceeds the predetermined value, i.e., at an appropriate timing at which the humidity of exhaust gases downstream of the adsorbent has sufficiently increased (risen) as the adsorption to the adsorbent proceeds to saturation. Also, the state of the adsorbent is determined based on the result of a comparison of the calory supplied to the exhaust system from the start to that time with the threshold determined by the threshold determining means. Since this threshold reflects the temperature state in the exhaust system at the start of the internal combustion engine, it is possible to more accurately determine the state of the adsorbent based on the result of comparison between the calory supplied to the exhaust system and the threshold, while actual temperature states of the exhaust system and adsorbent at the time the internal combustion engine is started, and after the start are reflected to the state determination.

Preferably, in the state determining apparatus for an exhaust gas purifier, the temperature state in the exhaust system is a temperature of cooling water when the internal combustion engine is started.

According to this preferred embodiment of the state determining apparatus, the temperature of the cooling water for the internal combustion engine when it is started can be used as a good parameter indicative of the temperature state in the exhaust system. Generally, since an internal combustion engine is provided with a water temperature sensor for detecting the temperature of a cooling water in order to detect an operating state of the internal combustion engine, such an existing water temperature sensor can be used to implement the temperature state detecting means at a low cost.

Preferably, the state determining apparatus for an exhaust gas purifier further comprises ambient temperature detecting means for detecting an ambient temperature of the humidity sensor; and relative humidity calculating means for calculating a relative humidity of exhaust gases from an output of the humidity sensor in accordance with the detected ambient temperature.

According to this preferred embodiment of the state determining apparatus, since the humidity of exhaust gases is calculated from the output of the humidity sensor in accordance with the ambient temperature around the humidity sensor, the relative humidity can be appropriately found as compensated for the temperature. Consequently, the state of adsorbent can be appropriately determined in accordance with the relative humidity found in this manner.

Preferably, in the state determining apparatus for an exhaust gas purifier, the adsorbent state determining means includes adsorbent deterioration determining means for determining a deterioration of the adsorbent as the state of the adsorbent.

As described above, a deteriorated adsorbent suffers from lower abilities to adsorb moisture as well as hydrocarbons, so that the humidity of exhaust gases rises earlier at a location downstream of the adsorbent. Therefore, according to the preferred embodiment of the state determining apparatus, a deterioration of the adsorbent can be accurately determined by the state determining technique of the present invention so far described, while the temperature states in the exhaust system and exhaust gases at and after the start of the internal combustion engine are deeply reflected to the state determination.

Preferably, in the state determining apparatus for an exhaust gas purifier, the adsorbent comprises zeolite.

According to this preferred embodiment of the state determining apparatus, the zeolite adsorbs moisture as well as hydrocarbons, and there is a high correlation between the abilities of the zeolite to adsorb both components, so that the advantages and effects so far described can be well provided by applying the present invention. The zeolite can implement an adsorbent which excels in heat resistance and is less susceptible to deterioration, as compared with, for example, silica gel, active carbons or the like when they are used as the adsorbent.

DETAILED DESCRIPTION OF THE EMBODIMENT

Figure 1:
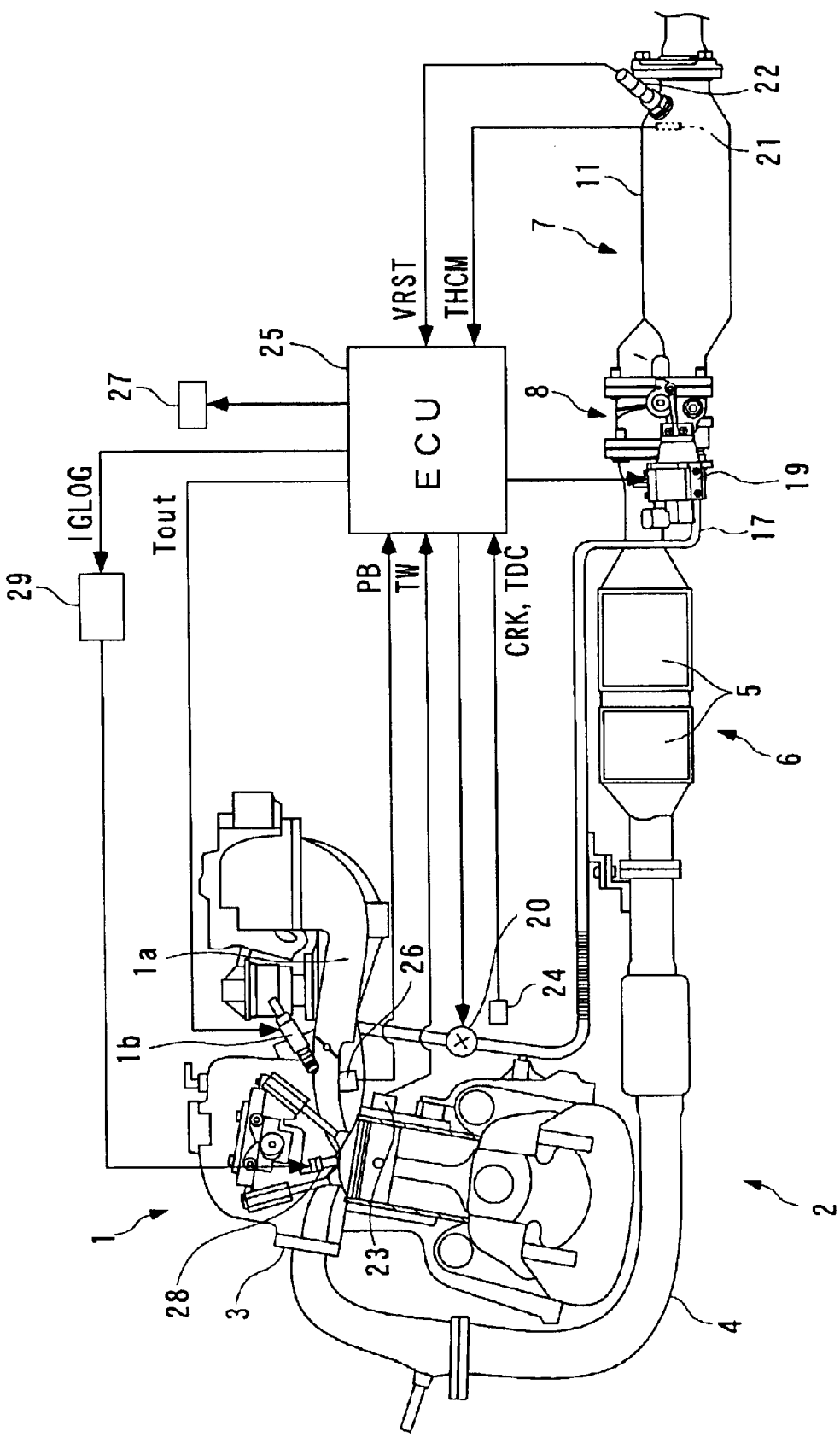
FIG. 1 is a diagram generally illustrating an internal combustion engine which is equipped with a state determining apparatus for an exhaust gas purifier according to one embodiment of the present invention.

In the following, a preferred embodiment of the present invention will be described in detail with reference to the accompanying drawings. FIG. 1 illustrates an internal combustion engine in which a state determining apparatus for an exhaust gas purifier is applied according to one embodiment of the present invention. The illustrated internal combustion engine (hereinafter referred to as the "engine") 1 is, for example, a four-cylinder four-cycle engine equipped in a vehicle, not shown. An exhaust system 2 of the engine 1 has an exhaust pipe 4 connected to the engine 1 through an exhaust manifold 3. A catalyzer 6 having two three-way catalysts 5, and a hydrocarbon adsorber 7 for adsorbing hydrocarbons are provided halfway in the exhaust pipe 4 as an exhaust gas purifier for purifying exhaust gases. The two three-way catalysts 5 of the catalyzer 6 are arranged adjacent to each other along the exhaust pipe 4, and purify harmful substances (hydrocarbons (HC), carbon monoxide (CO) and nitrogen oxides (NOx)) in exhaust gases passing through the catalyzer 6 by oxidation-reduction catalyst actions, when they are heated to a predetermined temperature (for example, 300° C.) or higher and activated.

Figure 2:
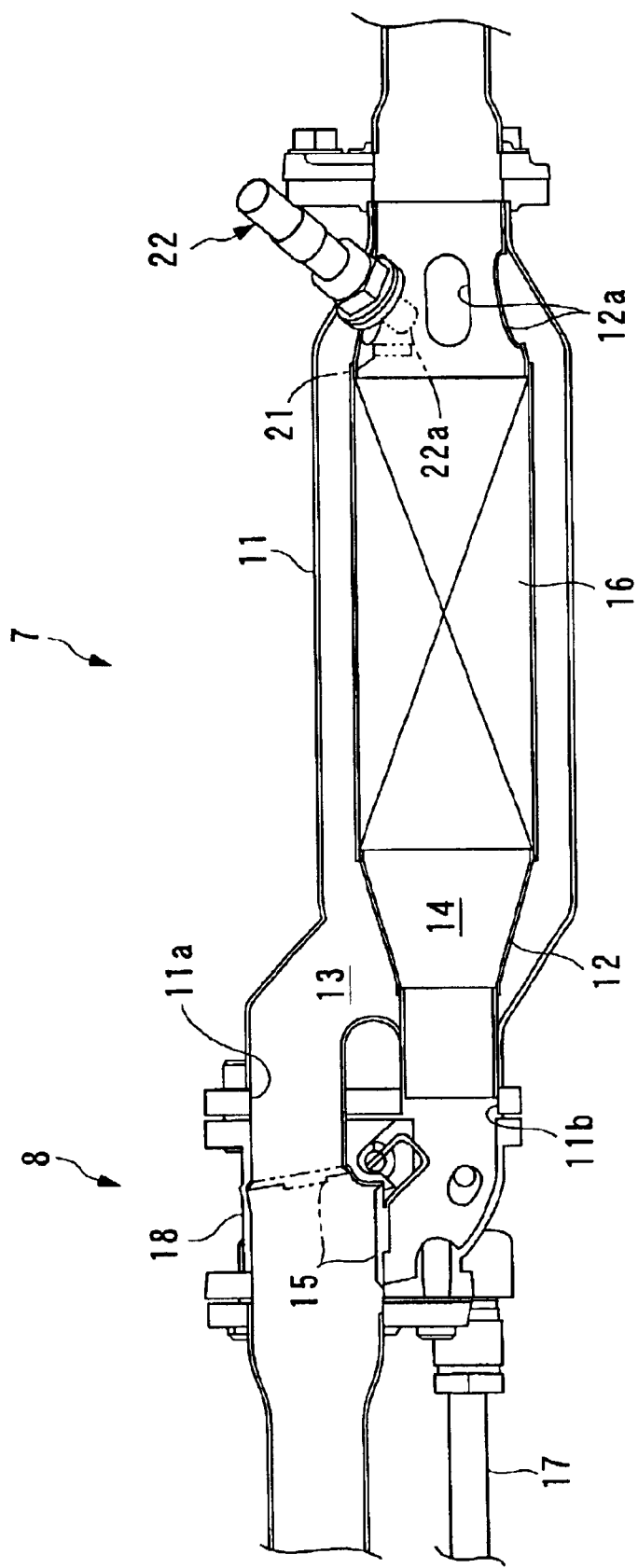
FIG. 2 is an enlarged cross-sectional view illustrating a hydrocarbon adsorbing device.

The hydrocarbon adsorber 7 in turn is arranged at a location downstream of the catalyst 6 in the exhaust pipe 4, and provided for reducing the amount of hydrocarbons emitted to the atmosphere by adsorbing hydrocarbons in exhaust gases during a starting period (for example, for approximately 30 to 40 seconds from the start) of the engine 1 in a cold state in which the three-way catalysts 5 have not been activated. As illustrated in FIGS. 1 and 2, the hydrocarbon adsorber 7 is coupled to an downstream end of the catalyzer 6 through an exhaust passage switch 8. The hydrocarbon adsorber 7 comprises a substantially cylindrical case 11; a bypass exhaust pipe 12 arranged within the case 11; and a cylindrical adsorbent 16 arranged halfway in the bypass exhaust pipe 12 for adsorbing hydrocarbons in exhaust gases which are introduced into the bypass exhaust pipe 12.

As illustrated in FIG. 2, the case 11 has its upstream end divided into two, i.e., an upper and a lower opening 11a, 11b. The upper opening 11a is in communication with a main passage 13 having an annular cross section and formed between the case 11 and bypass exhaust pipe 12, while the lower opening 11b is in communication with a bypass passage 14 which is an inner space of the bypass exhaust pipe 12.

The bypass exhaust pipe 12 has its upstream end connected to an inner surface of the lower opening 11b of the case 11, and a downstream end connected to an inner surface of a downstream end of the case 11, respectively, in an air tight state. The bypass exhaust pipe 12 is formed with a plurality (for example, five) of elongated communication holes 12a in a downstream end portion in the circumferential direction at equal intervals, such that the downstream end of the main passage 13 is in communication with the downstream end of the bypass passage 14 through these communication holes 12a.

The adsorbent 16 is comprised of a honeycomb core (not shown), made of a metal, which carries zeolite on its surface, and has the property of adsorbing moisture as well as hydrocarbons. As exhaust gases introduced into the bypass passage 14 pass through the adsorbent 16, hydrocarbons and moisture in the exhaust gases are adsorbed by the zeolite. The zeolite, which has high heat resistant properties, adsorbs hydrocarbons at low temperatures (for example, below 100° C.), and desorbs hydrocarbons once adsorbed thereby at a predetermined temperature or higher (for example, 100–250° C.). Then, the desorbed hydrocarbons are recirculated to the engine 1 from the hydrocarbon adsorber 7 through an EGR pipe 17 and an intake pipe 1a, and burnt by the engine 1.

The exhaust passage switch 8 is provided for selectively switching the passage of exhaust gasses downstream of the catalyzer 6 to the main passage 13 or bypass passage 14 in accordance with an activated state of the three-way catalysts 5. The exhaust pipe switch 8 comprises a substantially cylinder coupling pipe 18; and a pivotable switching valve 15 arranged in the coupling pipe 18. The switching valve 15 is driven by a switching valve driver 19 (see FIG. 1) which is controlled by an ECU 25, later described, for switching the exhaust gas passage to the main passage 13 when it is present at a position indicated by solid lines in FIG. 2 and for switching the exhaust gas passage to the bypass passage 14 when it is present at a position indicated by two-dot chain lines.

As described above, the EGR pipe 17 is coupled between the coupling pipe 18 and the intake pipe 1a of the engine 1a for recirculating a portion of exhaust gases to the engine 1, and an EGR control valve 20 is arranged halfway in the EGR pipe 17. The EGR control valve 20 is controlled by the ECU 25 to actuate and stop the EGR and control an EGR amount.

In the foregoing configuration, the exhaust gas passage is switched to the bypass passage 14 by the exhaust passage switch 8 immediately after a cold start of the engine 1, thereby leading exhaust gasses passing through the catalyzer 6 to the bypass passage 14. The exhaust gases are emitted to the atmosphere after hydrocarbons in the exhaust gases have been adsorbed by the adsorbent 16. Subsequently, as it is determined that hydrocarbons have been adsorbed by adsorbent 16, the exhaust gas passage is switched to the main passage 13 to lead the exhaust gases to the main passage 13 through the coupling pipe 18 for emission to the atmosphere. Also, as the EGR control valve 20 is opened to operate the EGR, a portion of the exhaust gases is recirculated to the intake pipe 1a through the bypass passage 14 and EGR pipe 17 as an EGR gas. Hydrocarbons desorbed from the adsorbent 16 are sent to the intake pipe 1a by the EGR gas and burnt by the engine 1.

Each of cylinders in the engine 1 is provided with an ignition plug 28 (only one is shown) which is connected to the ECU 25 through a distributor 29. Each ignition plug 28 is applied with a high voltage by a driving signal from the ECU 25 at a timing in accordance with an ignition time IGLOG, and then is shut off for discharging, thereby igniting an air/fuel mixture within each cylinder.

A humidity sensor 22 is attached to the case 11 of the hydrocarbon adsorber 7 at a location downstream of the adsorbent 16. The humidity sensor 22 has a sensor element 22a (see FIG. 2) comprising a porous body, for example, made of alumina, titania or the like. Taking advantage of the characteristic that its resistance value varies in accordance with the amount of moisture adsorbed into pores of the sensor element 22a, the humidity sensor 22 detects the humidity. Then, the humidity sensor 22 sends a detection signal indicative of the resistance value VRST of the sensor element 22a to the ECU 25. An ambient temperature sensor 21 (ambient temperature detecting means) comprising a thermistor or the like is provided near the sensor element 22a for detecting an ambient temperature THCM near the sensor element 22a and sending a detection signal indicative of the ambient temperature THCM to the ECU 25.

An engine water temperature sensor 23 (temperature state detecting means) comprising a thermistor or the like, and a crank angle sensor 24 are attached to the body of the engine 1. The engine water temperature sensor 23 detects an engine water temperature TW, which is the temperature of cooling water circulating within a cylinder block of the engine 1, and sends a detection signal indicative of the engine water temperature TW to the ECU 25. The crank angle sensor 24, on the other hand, outputs a CRK signal and a TDC signal, which are pulse signals, to the ECU 25 every predetermined crank angle as a crack shaft, not shown, of the engine 1 is rotated. An intake pressure sensor 26 is attached to the intake pipe 1a for detecting an absolute pressure PB within the intake pipe 1a and sending a detection signal indicative of the absolute pressure PB to the ECU 25. An alarm lamp 27 is further connected to ECU 25 for generating an alarm by lighting when it is determined that the absorbent 16 is deteriorated.

In this embodiment, the ECU 25 functions as an adsorbent state determining means, a calory calculating means, a threshold determining means, a relative humidity calculating means, and an adsorbent deterioration determining means. The ECU 25 is based on a microcomputer which comprises an I/O interface, a CPU, a RAM, a ROM and the like. The detection signals from the aforementioned sensors such as the humidity sensor 22 are inputted to the CPU after they are A/D converted and reshaped in the I/O interface.

The CPU determines an operating state of the engine 1 based on engine parameter signals detected by a variety of sensors described above, calculates a fuel injection time Tout and an ignition time IGLOG in accordance with the result of determination in synchronism with the generation of a TDC signal, and outputs driving signals based on the result of calculation to the injector 28 and distributor 29. The CPU also controls the switching valve driver 19 and EGR control valve 20 in accordance with a control program, tables and the like stored in the ROM in response to the detection signals of the various sensors, and determines the state of the adsorbent 16 whether or not it is deteriorated.

Figure 3:
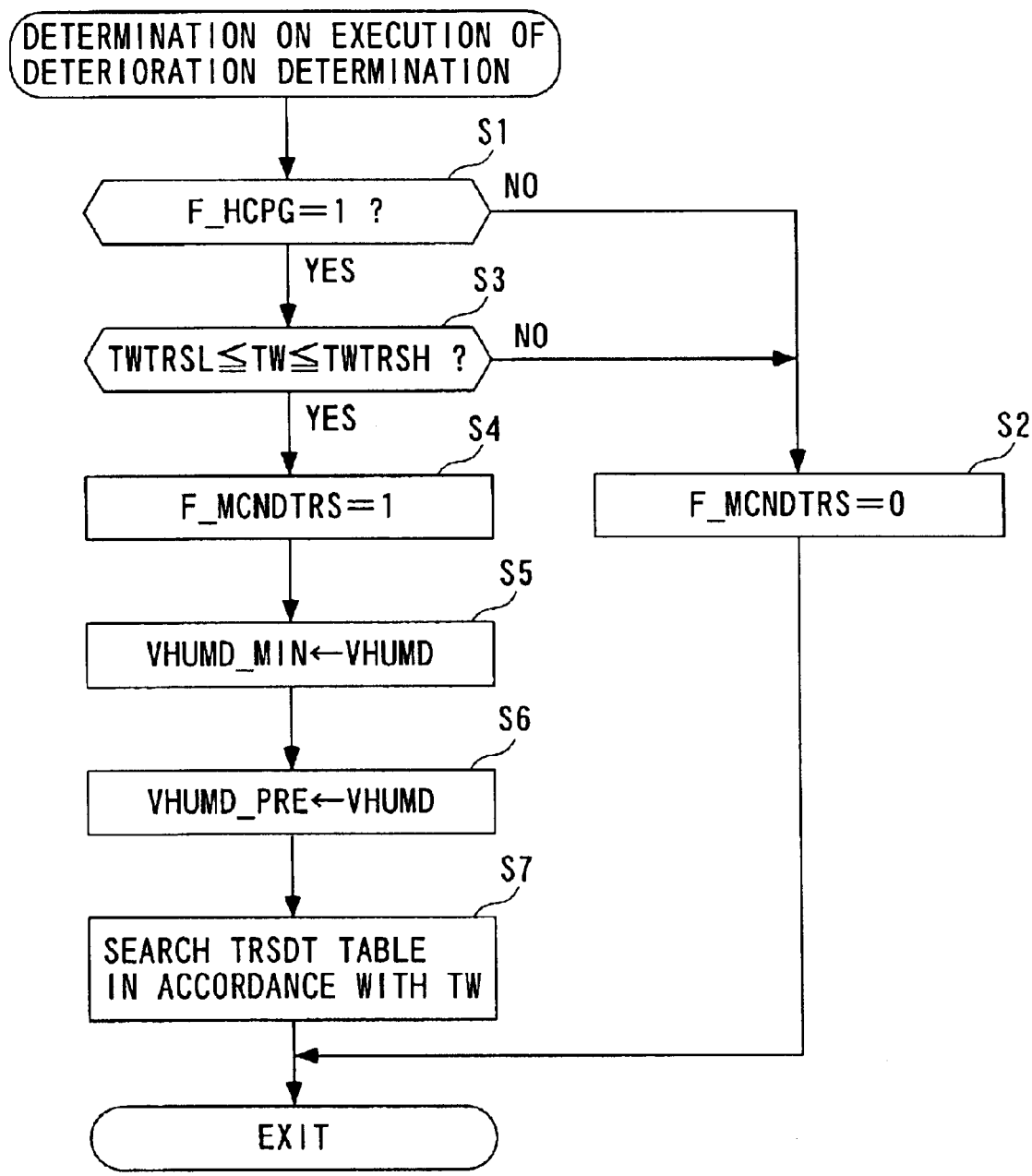
FIG. 3 is a flow chart illustrating a routine for determining whether or not a deterioration determination is executed for an adsorbent.

Next, processing for determining a deterioration of the adsorbent 16 will be described with reference to FIGS. 3 to 10. FIG. 3 illustrates a routine for determining whether or not a deterioration determination is executed for the adsorbent 16. This routine is executed only once immediately after the engine 1 is started.

First, in this routine, it is determined at step 1 (labeled as "S1" in the figure. The same applies to the following description) whether or not a desorption completion flag F_HCPG is "1" which indicates that hydrocarbons have been completely desorbed from the adsorbent 16 during the preceding operation. If the result of determination at step 1 is NO, i.e., when hydrocarbons have not been desorbed during the preceding operation, a deterioration determination enable flag F_MCNDTR is set to "0" (step 2), on the assumption that a failure in establishment of conditions for executing a routine for determining the deterioration of the adsorbent 16 because the hydrocarbons remaining in the adsorbent 16 prevents a proper determination on the deterioration of the adsorbent 16, followed by termination of the routine.

On the other hand, if the result of determination at step 1 is YES, indicating that hydrocarbons have been desorbed during the preceding operation, the routine proceeds to step 3, wherein it is determined whether or not the engine water temperature TW is equal to or higher than its lower limit value TWTRSL (for example, 0° C.) and equal to or lower than its upper limit value TWTRSH (for example, 50° C.). If the result of determination at step 3 is NO, i.e., when the engine water temperature TW at the start of the engine 1 is out of a predetermined range defined by the upper and lower limit values TWTRSL/TWTRSH, the deterioration determination enable flag F_MCNDTRS is set to "0" (step 2) assuming a failure in establishment of the conditions for executing the routine for determining the deterioration of the adsorbent 16, as is the case with the incomplete desorption of hydrocarbons, followed by termination of the routine.

On the other hand, if the result of determination at step 3 is YES, indicating that the engine water temperature TW is within the predetermined range, the deterioration determination enable flag F_MCNDTRS is set to "1" (step 4), assuming successful establishment of the conditions for executing the routine for determining the deterioration of the adsorbent 16. Next, the relative humidity VHUMD detected by the humidity sensor 22 at that time is set as an initial value for a minimum value VHUMD_MIN (step 5) and a preceding value VHUMD_PRE (step 6), respectively, of the relative humidity VHUMD. The relative humidity VHUMD is calculated from a table shown in FIG. 4 in accordance with a sensor resistance value VRST detected by the humidity sensor 22.

Figure 4:
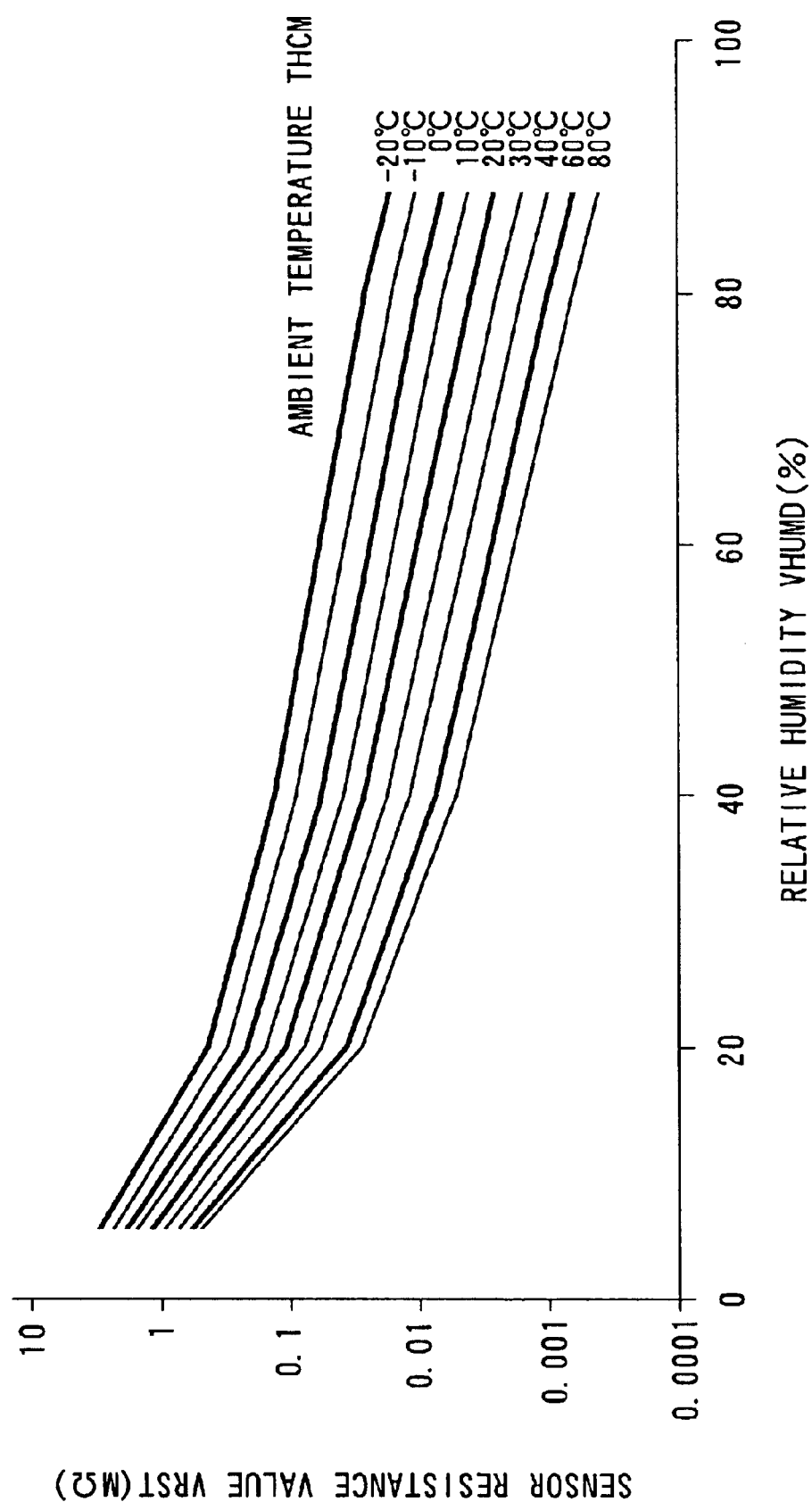
FIG. 4 shows a table for calculating a relative humidity VHUMD in accordance with an ambient temperature THCM and a sensor resistance value VRST.

The table shown in FIG. 4 is made up of nine tables corresponding to the ambient temperature THCM, and each table is set in such a manner that the relative humidity VHUMD is lower as the sensor resistance value VRST is higher. Also, among tables, the relative humidity VHUMD is higher as the ambient temperature THCM is lower. One table corresponding to the ambient temperature THCM detected by the ambient temperature sensor 21 is selected from among these tables, and a table corresponding to the sensor resistance value VRST detected by the humidity sensor 22 is searched to calculate the relative humidity VHUMD. When the ambient temperature THCM presents a value between tables, the relative humidity VHUMD is calculated by an interpolation. By finding the relative humidity VHUMD in this manner, the relative humidity VHUMD can be appropriately calculated for exhaust gases which are compensated for the temperature.

Figure 5:
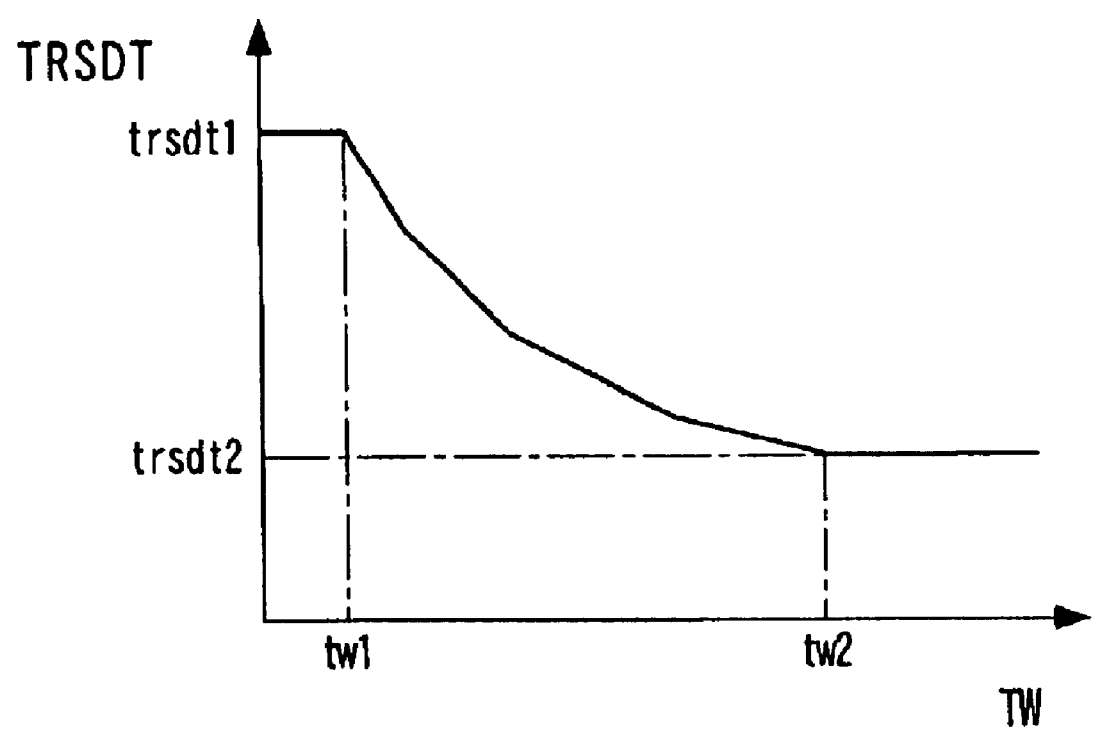
FIG. 5 is a deterioration determining threshold table showing the relationship between an engine water temperature TW at the start of the engine and an adsorbent deterioration determining threshold TRSDT.

Next, the routine proceeds to step 7, where a deterioration determination threshold table (hereinafter referred to as the "TRSDT table") for the adsorbent 16 shown in FIG. 5 is searched in accordance with the engine water temperature TW to calculate a deterioration determination threshold TRSDT (threshold) for determining the deterioration of the adsorbent 16, later described, followed by termination of the routine.

As shown in FIG. 5, in the TRSDT table, the deterioration determination threshold TRSDT is set at a first predetermined value trsdt1 when the engine water temperature TW is below a first predetermined temperature tw1 (for example, 0° C.), and at a second predetermined value trsdt2 (trsdt1>trsdt2) when the engine water temperature TW exceeds a second predetermined temperature tw2 (for example 40° C.) higher than the first predetermined temperature tw1. Also, when the engine water temperature TW is between the two predetermined temperatures tw1, tw2 (tw1≦TW≦tw2), the deterioration determination threshold TRSDT is set at a larger value as the engine water temperature TW is lower.

Figure 6:
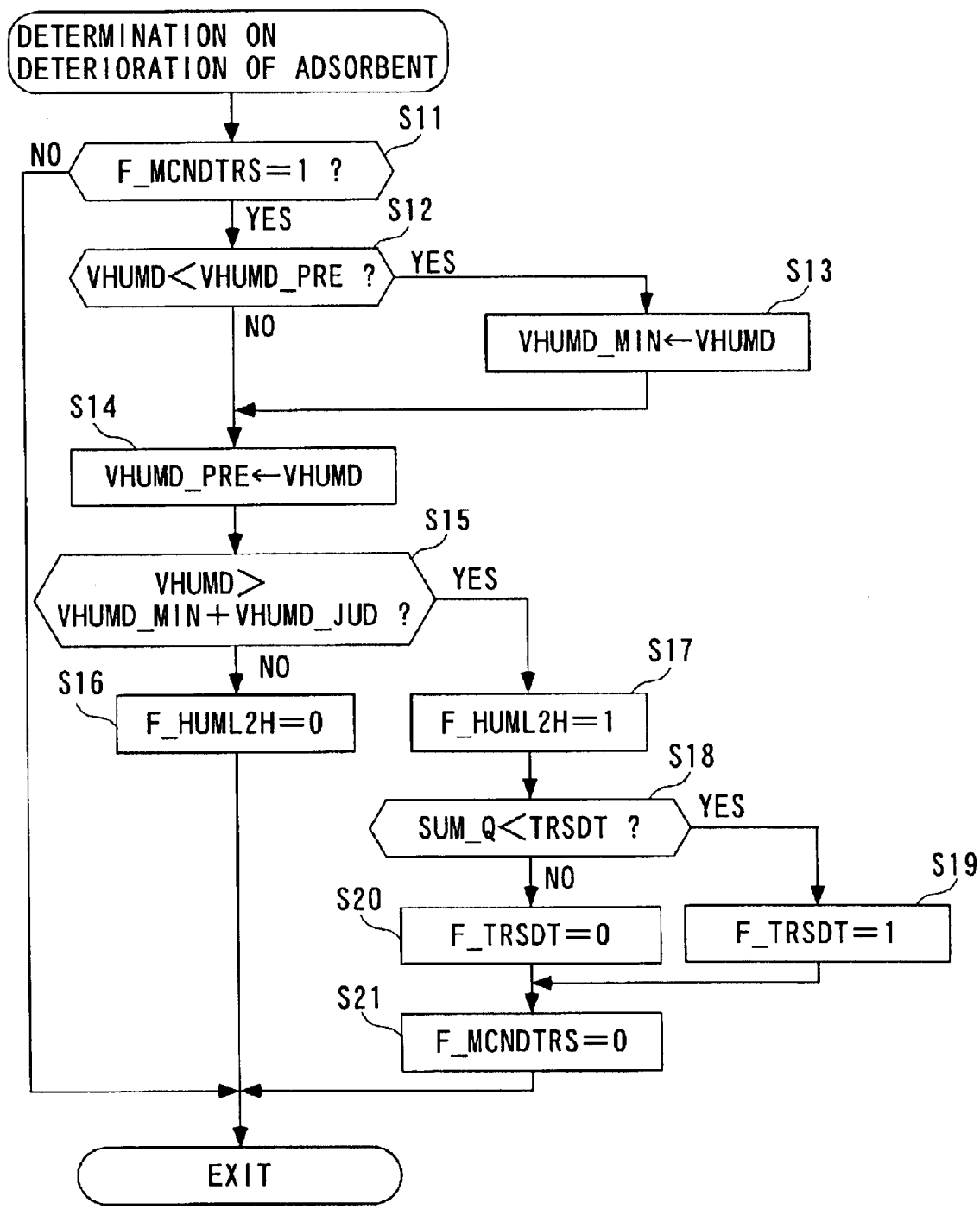
FIG. 6 is a flow chart illustrating a routine for determining the deterioration of the adsorbent.

FIG. 6 illustrates a routine for determining the deterioration of the adsorbent 16, executed in accordance with the result of determination made by the routine in the aforementioned FIG. 3. This routine is executed in synchronism with the generation of a TDC signal. First, it is determined whether or not the deterioration determination enable flag F_MCNDTRS is "1" (step 11). If the result of determination at step 11 is NO, showing a failure in establishment of the condition for determining the deterioration of the adsorbent 16, the routine is terminated without further processing.

On the other hand, if the result of determination at step 11 is YES, showing successful establishment of the condition for determining the deterioration of the adsorbent 16, it is determined whether or not the relative humidity VHUMD calculated from a current detection value provided by the humidity sensor 22 is smaller than the preceding value VHUMD_PRE (step 12). If the result of determination at step 12 is YES, i.e., VHUMD<VHUMD_PRE, the relative humidity VHUMD at that time is set as a minimum value VHUMD_MIN (step 13). In this manner, the minimum value VHUMD_MIN is updated at all times when the relative humidity VHUMD is lower than the preceding value thereof, so that the minimum value VHUMD_MIN indicates a minimum value immediately before the relative humidity VHUMD begins rising (see time t0 in FIG. 10). If the result of determination at step 12 is NO, or after executing step 13, the routine proceeds to step 14, where the current relative humidity VHUMD is shifted to the preceding value VHUMD_PRE.

Next, it is determined whether or not the relative humidity VHUMD is larger than the sum of the minimum value VHUMD_MIN and a predetermined rising determination value VHUMD_JUD (for example, 10%) (step 15). If the result of determination at step 15 is NO, a rising establishment flag F_HUML2H is set to "0" (step 16), on the assumption that the relative humidity VHUMD has not sufficiently risen, followed by termination of the routine.

On the other hand, if the result of determination at step 15 is YES, showing that VHUMD>VHUMD_MIN+VHUMD_JUD is established, i.e., when the relative humidity VHUMD rises from the minimum value VHUMD_MIN beyond the rising determination value VHUMD_JUD (at time t1 in FIG. 10), the rising establishment flag F_HUML2H is set to "1" (step 17), on the assumption that the relative humidity VHUMD has sufficiently risen and is now stably rising.

Next, the routine proceeds to step 18, where it is determined whether or not an accumulated calory value SUM_Q is smaller than the deterioration determination threshold TRSDT calculated at the aforementioned step 7 in FIG. 3. This accumulated calory value SUM_Q indicates an accumulated value (aggregate) of calory supplied to the exhaust system 2 after the engine 1 was started, and is calculated in the following manner.

Figure 7:
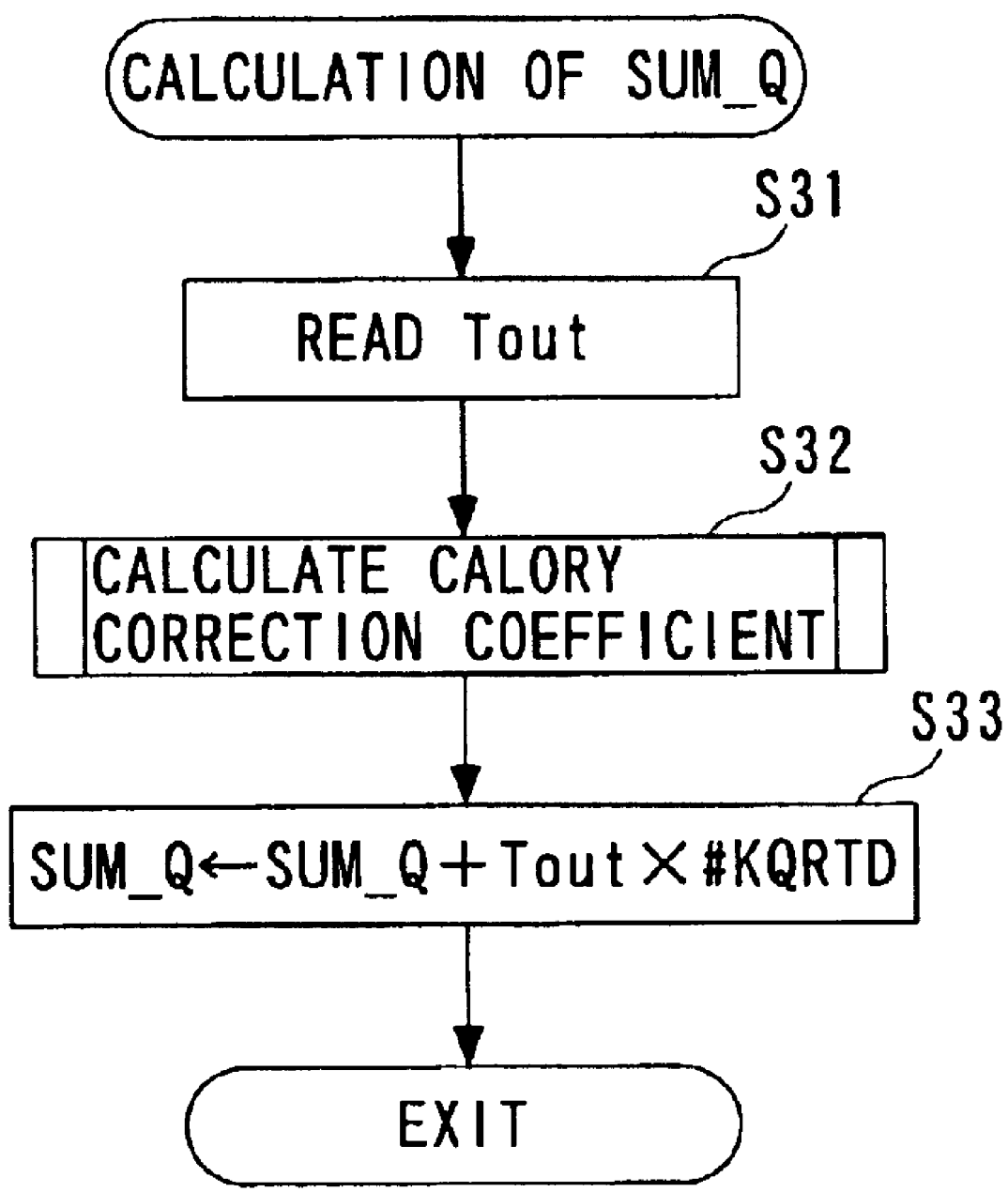
FIG. 7 is a flow chart illustrating a routine for calculating an accumulated calory value SUM_Q applied to an exhaust system.

FIG. 7 illustrates a routine for calculating the accumulated calory value SUM_Q. This routine is executed in synchronism with the generation of a TDC signal. It should be noted that the accumulated calory value SUM_Q is reset to zero when an ignition switch is turned ON upon starting the engine 1.

Figure 8:
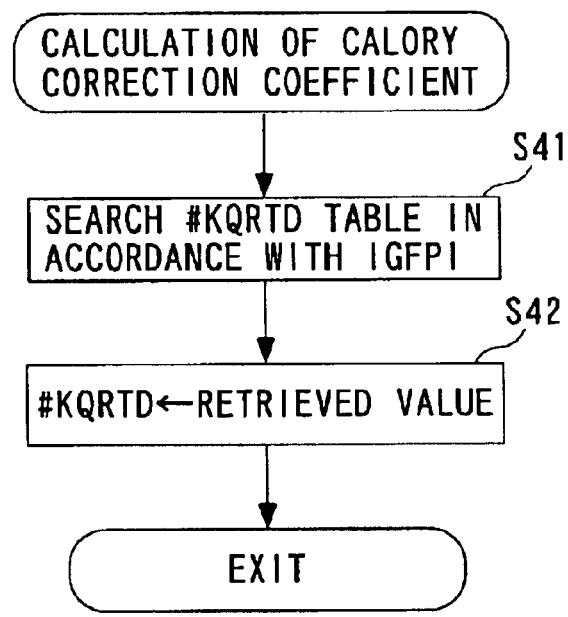
FIG. 8 is a flow chart illustrating a routine for calculating a calory correction coefficient #KQRTD.
Figure 9:
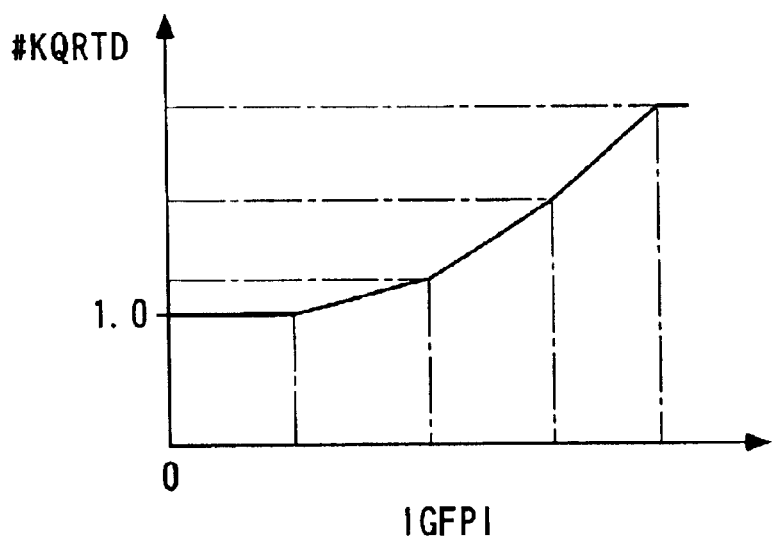
FIG. 9 is a table showing the relationship between a rapid warm-up retard amount IGFPI of the ignition timing and a calory correction term #KQRTD.
Figure 10:
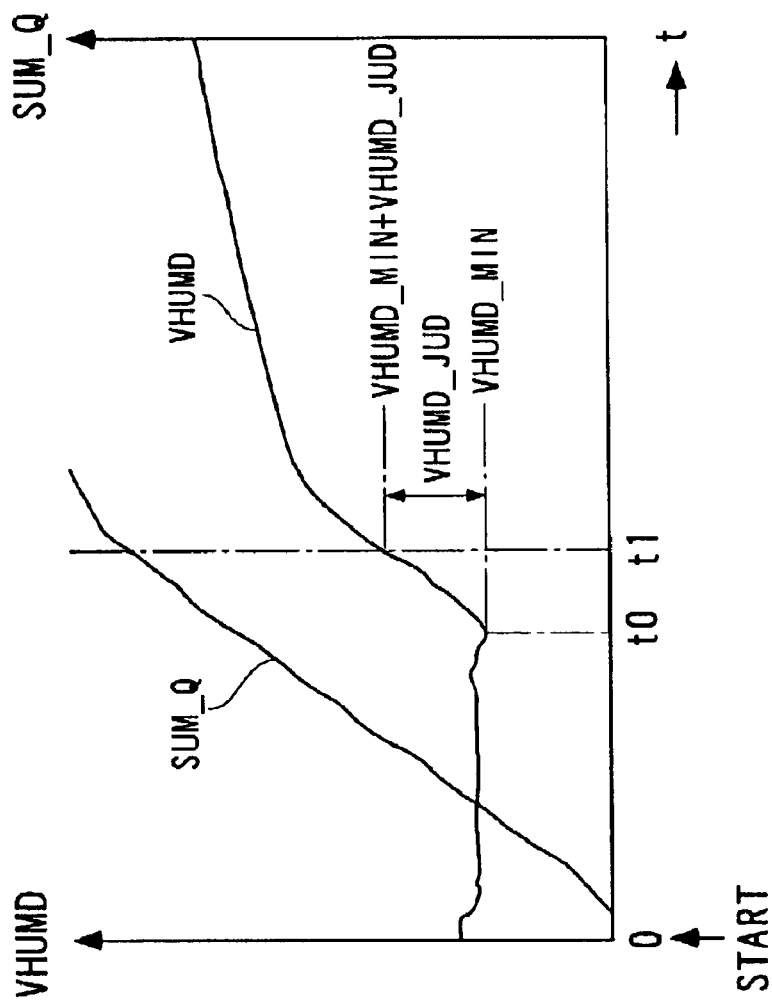
FIG. 10 is a time chart showing an exemplary transition of a relative humidity VHUMD detected by a humidity sensor and accumulated calory value SUM_Q from the start of the engine.

First, in this routine, a fuel injection time Tout of an injector 1b is read for each cylinder (step 31), and a calory correction coefficient #KQRTD is calculated (step 32). As illustrated in FIG. 8, a routine for calculating the calory correction coefficient #KQRTD at step 32 searches a table shown in FIG. 9 as one example, in accordance with a rapid warm-up retard amount IGFPI of the ignition time (step 41), and a retrieved value is set as the calory correction coefficient #KQRTD (step 42). The rapid warm-up retard amount IGFPI is set at a value larger than zero, for conducting the rapid warm-up control in order to activate the three-way catalysts 5 when the engine 1 is started, and subtracted from a basic ignition time. As shown in FIG. 9, the calory correction coefficient #KQRTD is set at the value 1.0 when the rapid warm-up retard amount IGFPI is zero, i.e., when the rapid warm-up control is not executed, and is set at a larger value as the rapid warm-up retard amount IGFPI is larger for four grid points of the rapid warm-up retard amount IGFPI. This is because the calory generated in each cylinder is radiated to the exhaust system 2 in a larger proportion as the rapid warm-up retard amount IGFPI is larger to increase the temperature of exhaust gases.

Next, turning back to step 33 in FIG. 7, the product of the fuel injection time Tout read at step 31 and the calory correction coefficient #KQRTD calculated at step 32 is added to the preceding value of the accumulated calory value SUM_Q, and the resulting value is set as the current accumulated calory value SUM_Q.

The accumulated calory value SUM_Q calculated in this manner represents the calory supplied by the engine 1 to the exhaust system 2 from the start. Therefore, as the accumulated calory value SUM_Q is larger, this shows that larger calory is supplied to the adsorbent 16. On the other hand, the adsorbent 16 exhibits a high adsorbing ability when its temperature is low, but experiences a degraded adsorbing ability as the temperature rises. When the temperature has risen to some extent, the relative humidity VHUMD rises up. Therefore, if the result of determination at step 18 in FIG. 6 is YES, i.e., when SUM_Q<TRSDT, it is determined that the adsorbent 16 has been deteriorated on the assumption that the relative humidity VHUND has risen earlier, although the adsorbent 16 has not been supplied with sufficient calory for rising the relative humidity VHUMD, and a deterioration flag F_TRSDT is set to "1" (step 19) for showing this determination.

On the other hand, if the result of determination at step 18 is NO, i.e., when SUM_Q≧TRSDT, it is determined that the adsorbent 16 is not deteriorated on the assumption that the relative humidity VHUMD rises for the first time after the adsorbent 16 is supplied with sufficient calory, and the deterioration flag F_TRSDT is set to "0" (step 20).

At step 21 subsequent to step 19 or 20, the deterioration determination enable flag F_MCNDTR is set to "0" in response to the termination of the deterioration determination for the adsorbent 16, followed by termination of the routine.

As described above in detail, according to this embodiment, after the engine 1 is started, it is determined whether or not the adsorbent 16 is deteriorated by determining whether or not the relative humidity VHUMD at a location downstream of the adsorbent 16 has risen using the rising determination value VHUMD_JUD, and comparing the accumulated calory value SUM_Q from the time the engine 1 is started to the time the relative humidity VHUMD has risen with the deterioration determination threshold TRSDT. As described above, the accumulated calory value SUM_Q is calculated to be a larger value as the rapid warm-up retard amount IGFPI of the ignition time is larger because the calory correction coefficient #KQRTD multiplied by the fuel injection time Tout is set at a larger value. Consequently, the accumulated calory value SUM_Q can be appropriately calculated while the temperature states of the exhaust system 2 and exhaust gases at the time of start and after the start are well reflected to the accumulated calory value SUM_Q, thereby making it possible to accurately determine the deterioration of the adsorbent 16. Also, as discussed in connection with the aforementioned FIG. 5, the deterioration determination threshold TRSDT is set at a larger value as the engine water temperature TW is lower at the start. In other words, since the deterioration determination threshold value TRSDT is set at a larger value as larger calory is required for heating the adsorbent 16, the adsorbent 16 can be determined for deterioration more appropriately by the comparison at step 18 in FIG. 6.

It should be understood that the present invention is not limited to the foregoing embodiment but can be practiced in a variety of manners. For example, while the foregoing embodiment employs the relative humidity VHUMD as a parameter indicative of the humidity of exhaust gases, any other suitable parameter may be employed instead. Also, while the engine water temperature TW detected by the engine water temperature sensor 23 is substituted for the temperature state in the exhaust system 2, and the ambient temperature THCM of the humidity sensor 22 is directly detected by the ambient temperature sensor 21, these temperatures may be estimated based on a value detected by the humidity sensor 22. Otherwise, the present invention may be modified in details of the configuration as appropriate without departing from the spirit and scope of the invention set forth in the appended claims.

As described above in detail, the state determining apparatus for an exhaust gas purifier according to the present invention can advantageously determine in a high accuracy the state of the exhaust gas purifier including an adsorbent for adsorbing hydrocarbons, including a deterioration of the adsorbent, in accordance with an ignition time of the internal combustion engine.

What is claimed is:

1. A state determining apparatus for an exhaust gas purifier arranged in an exhaust system of an internal combustion engine for determining a state of said exhaust gas purifier including an adsorbent adapted for adsorbing hydrocarbons and moisture in exhaust gases, said state determining apparatus comprising:

a humidity sensor arranged at a location downstream of said adsorbent in said exhaust system for detecting humidity of exhaust gases; and an adsorbent state determining means for determining a state of said adsorbent in accordance with the humidity of exhaust gases detected by said humidity sensor and an ignition time of said internal combustion engine.

2. A state determining apparatus for an exhaust gas purifier according to claim 1, further comprising:

an ambient temperature detecting means for detecting ambient temperature of said humidity sensor; and a relative humidity calculating means for calculating relative humidity of exhaust gases from an output of said humidity sensor in accordance with the detected ambient temperature.

3. A state determining apparatus for an exhaust gas purifier according to claim 1, wherein said adsorbent state determining means includes an adsorbent deterioration determining means for determining deterioration of said adsorbent as the state of said adsorbent.

4. A state determining apparatus for an exhaust gas purifier according to claim 1, wherein said adsorbent comprises zeolite.

5. A state determining apparatus for an exhaust gas purifier arranged in an exhaust system of an internal combustion engine for determining a state of said exhaust gas purifier including an adsorbent adapted for adsorbing hydrocarbons and moisture in exhaust gases, said state determining apparatus comprising:

a humidity sensor arranged at a location downstream of said adsorbent in said exhaust system for detecting humidity of exhaust gases;

an adsorbent state determining means for determining a state of said adsorbent in accordance with the humidity of exhaust gases detected by said humidity sensor and an ignition time of said internal combustion engine; and a calory calculating means for calculating calory supplied from said internal combustion engine to said exhaust system after said internal combustion engine is started, wherein said adsorbent state determining means further determines the state of said adsorbent in accordance with the calory calculated by said calory calculating means.

6. A state determining apparatus for an exhaust gas purifier according to claim 5, wherein said calory calculating means calculates the calory in accordance with the amount of fuel supplied to said internal combustion engine after the start and said ignition time.

7. A state determining apparatus for an exhaust gas purifier according to claim 6, further comprising:

a temperature state detecting means for determining a temperature state in said exhaust system; and a threshold determining means for determining a threshold based on the temperature state in said exhaust system detected at the time said internal combustion engine is started, wherein said adsorbent state determining means determines the state of said adsorbent based on a result of comparison between the calory and the threshold when a change in the value detected by said humidity sensor after said internal combustion engine is started exceeds a predetermined value set therefor.

8. A state determining apparatus for an exhaust gas purifier according to claim 7, wherein the temperature state in said exhaust system is a temperature of cooling water when said internal combustion engine is started.

* * * * *